United States Patent Office 2,723,930
Patented Nov. 15, 1955

2,723,930
BRAZING FLUX AND ITS PREPARATION FOR ALUMINUM

Eugene Wainer, Cleveland Heights, Ohio, assignor to Horizons Incorporated, Princeton, N. J., a corporation of New Jersey No Drawing. Application September 13, 1954, Serial No. 455,797

8 Claims. (Cl. 148—26)

This invention relates to the brazing of aluminum. More particularly, the invention resides in a novel flux composition for use in brazing aluminum as well as the method of preparing this composition.

The brazing of aluminum, which is carried out at a temperature at or slightly above the melting point of aluminum and which requires the use of a filler rod of brazing metal of either pure aluminum or an aluminum alloy containing about 8% silicon, is made difficult by the fact that aluminum always bears a surface layer of aluminum oxide to which other aluminum as well as other metals will not adhere. Over the period of the last half century there have been many proposals of flux composition which removed such an oxide layer and thus exposed a fresh aluminum surface to which a brazing metal would adhere, and these compositions frequently contained aluminum chloride or aluminum sulphate in admixture with other metal halides. However, although such flux compositions have been useful in the brazing of aluminum, all procedures for using these fluxes have included the step of forming a freshly exposed metallic aluminum surface by scraping away the surface oxide layer while the surface is protected from the atmosphere by a supernatant layer of the flux.

We have now discovered that a certain relatively simple and inexpensive composition that is both fusible below the melting point of aluminum and physically and chemically stable above the melting point of aluminum has, when fused, such affinity for the usual oxide coating on an aluminum surface that it will effectively remove this surface oxide layer and thus expose an oxide-free aluminum surface eminently suitable for brazing. The novel flux composition found to have these characteristics is composed essentially of aluminum chloride and one or more alkali metal chlorides of the group consisting of sodium, potassium, and lithium chlorides. The novel flux composition of this invention is not simply a mixture of the aluminum chloride and the alkali metal chloride but is the intimate combination of these two constituents which results when a mixture of aluminum chloride and an alkali metal chloride is fused to the state of homogeneity. Moreover, the relative proportions of aluminum chloride and alkali metal chloride in this product is important, molar proportion of aluminum chloride in the aluminum chloride-alkali metal chloride mixture ranging between about 20% and 50%. The weight proportions corresponding to this range of mol ratios for binary compositions involving aluminum chloride and a single alkali metal chloride is shown in the following table:

| Composition | Mol Percent AlCl₃ | Corresponding Weight Percent AlCl₃ |
|---|---|---|
| AlCl₃—LiCl | 20 | 44 |
| AlCl₃—LiCl | 50 | 76 |
| AlCl₃—NaCl | 20 | 36 |
| AlCl₃—NaCl | 50 | 70 |
| AlCl₃—KCl | 20 | 31 |
| AlCl₃—KCl | 50 | 64 |

The aluminum which may be brazed using the flux composition of the invention may be substantially pure aluminum or any of its alloys in which aluminum is present in an amount of about 90% or more by weight, and both aluminum metal itself and such aluminum base alloys are therefore included in the subsequent use of the term "aluminum" herein and in the claims. The brazing of aluminum requires the use of a filler rod of brazing metal which may be either pure aluminum or an aluminum alloy containing up to about 8% silicon. The composition of the invention is not limited to the brazing together of two aluminum parts but is equally applicable to the brazing of aluminum to other metals to which the filler rod material will adhere. These "other" metals include copper, copper-base alloys and particularly the brasses and beryllium copper, silicon bronzes and manganese bronzes. Thus, the joining of aluminum parts to non-aluminum parts is made possible by simple brazing techniques when using the novel flux composition of the present invention.

The flux composition of the invention consists essentially of aluminum chloride and one or more alkali metal chlorides consisting of sodium chloride, potassium chloride and lithium chloride. Because of its lower cost, sodium chloride is presently preferred as the alkali metal halide constituent and will be referred to hereinafter as a representative of this group, but it must be understood that what is said hereinafter with respect to the use of sodium chloride applies with equal effect to potassium and lithium chlorides. The form of the mixture of aluminum chloride and alkali metal chloride pursuant to the invention is important. Simple mixtures of these salts are not effective as brazing fluxes for the reason that at the temperatures attained when brazing aluminum the aluminum chloride constituent of such mixtures volatilizes and is lost from the mixture long before the sodium chloride constituent thereof has melted. It is necessary therefore that a homogeneous mixture of the two salts be prepared in which all of the aluminum chloride is in solution with fused sodium chloride to form an intimate mixture stable at aluminum brazing temperatures. The resulting homogeneous mixture may be used either in its molten condition or it may be allowed to solidify following which it is broken up into a mass of relatively fine particles which can be easily handled and applied to the aluminum surface to be brazed.

The relative proportions of aluminum chloride and sodium chloride in the homogeneous composition of the invention are important. Compositions having in excess of about 50 mol percent (70 percent by weight) of aluminum chloride do not have the requisite physical and chemical stability required of a flux for brazing aluminum at temperatures at or above the melting point of aluminum. Amounts of sodium chloride in the flux composition in excess of about 80 mol percent result in a composition that tends to lose to a significant degree the affinity for an aluminum oxide surface film which is characteristic of the composition of the invention. Thus it will be seen that homogeneous mixtures of aluminum chloride and sodium chloride in which the molar proportion of aluminum chloride ranges from about 20 to 50%, and preferably between about 20 to about 25 mol percent of aluminum chloride, comprise the composition of the present invention.

In preparing the flux of the invention, it is advisable to add the aluminum chloride and sodium chloride components to a melting vessel in such order that the sodium chloride will serve as a blanket layer to prevent the escape of aluminum chloride vapor as the mixture is heated. Although sodium chloride melts at about 800° C., raising the temperature of the aluminum chloride blanketed with sodium chloride to about 300° C. causes the aluminum chloride to melt and dissolve a major portion of the sodium chloride to form a mushy mixture of molten aluminum chloride and sodium chloride with unfused sodium chloride. The temperature of the mixture is then gradually raised to about 600° to 700° C. until substantially all of the sodium chloride has dissolved in the fluid to form a clear liquid. After the liquid state has been attained, it is advantageous to stir the liquid melt in order to insure complete homogeneity of the flux components. Once this homogeneity has been achieved by melting, and preferably by further stirring of the metal, the liquid flux composition is allowed to cool and solidify. The solid composition is then advantageously crushed or ground to a fine state, advantageously to −325 mesh (Tyler Standard), or even to powder form, whereupon it is ready for use.

The flux composition may be applied to the aluminum surface to be brazed either in its molten form as noted hereinabove, in the form of the finely divided product described hereinabove, or as a paste in which the finely divided flux composition is mixed with a small amount of an inert liquid such as carbon tetrachloride. Irrespective of the manner of application of the flux to the aluminum surface to be brazed, the flux composition of the invention promptly removes the normal oxide layer of this aluminum surface when the flux is brought into contact in the fluid state with this oxide layer, thus exposing a clean bright metal surface to which the brazing metal readily adheres.

On fusing the homogeneous flux composition of the invention, two or more phases containing the flux constituents may appear. Nevertheless, all of the aluminum chloride and a major portion of the sodium chloride are present in the composition in the form of a phase having a melting point well below the melting point of aluminum, thereby insuring that the composition is fusible below the melting point of aluminum. A minor portion of the sodium chloride may be present in the fluid composition in a phase which does not melt at a temperature below the melting point of aluminum. In the case of such compositions, the flux is nevertheless fusible at a temperature below the melting point of aluminum and, consequently, is capable of removing the surface oxide layer from an aluminum part to be brazed. The useful component of the flux is the aluminum chloride-sodium chloride-containing phase which fuses at a temperature below the melting point of aluminum. An excessive amount of unfused sodium chloride in admixture with the fused aluminum chloride-sodium chloride phase interferes with the oxide dissolving activity of the flux composition. Consequently, it has been found that the practical upper limit of sodium chloride content of the flux composition is about 80 mol percent. Molar amounts of sodium chloride above this percentage result in increasing loss of effectiveness as a brazing flux.

The brazing flux composition of the present invention may be used in a brazing operation employing an aluminum filler rod as the brazing metal and in which the open flame of a torch is the source of heat. After the brazing of the aluminum workpiece is completed the flux is readily removed from the workpiece by washing with water so as to remove all vestige of potentially corrosive chloride salts.

The following examples will illustrate the preparation and use of the flux composition of the invention:

Example I

A flux composition was prepared by heating in a melting vessel 40 parts by weight of aluminum chloride under a blanket layer of 60 parts by weight of sodium chloride. The temperature of the mixture was maintained at 300° C. until all of the aluminum chloride and a portion of the sodium chloride had formed a fused mass in which the unfused portion of the sodium chloride was admixed. The temperature was then gradually raised accompanied by a stirring until a clear homogeneous melt had formed whereupon the molten mass was cooled to solidify the mass. The solidified mass was then pulverized to a −325 mesh powder. To braze a joint, in an aluminum workpiece the powder was spatulated along the joint to be made and the aluminum in the vicinity of the joint was heated with a torch to fuse the flux composition. The composition fused at a temperature below the melting point of aluminum and readily dissolved the surface oxide layer of the aluminum surface in contact therewith thus exposing a clean, bright aluminum surface. A filler rod of pure aluminum was then applied to the bright aluminum surface at the joint and the torch was applied to the end of the rod to melt the aluminum. The molten aluminum from the filler rod flowed smoothly into the joint and readily wetted the clean aluminum surfaces. On cooling, the brazed workpiece was washed with water to remove any residual flux. The brazing operation resulted in a flawless brazed joint having a strength at least as great as that of the aluminum of the workpiece.

Example II

A flux composition for brazing aluminum was made by melting 45 parts by weight of aluminum chloride under a blanket layer of 60 parts by weight of sodium chloride. The mixture was heated as in Example I until a clear homogeneous melt was formed, the mixture first going through a mushy state in which the sodium chloride was present in at least two phases. After homogenization and solidification of the mixture, the solid mass was pulverized for use as a brazing flux. The method of use of this flux composition was similar to that described in Example I. A filler rod of aluminum alloy containing about 8% silicon was employed as the brazing metal. The brazed joint resulting from the brazing operation was strong and was without apparent flaw.

It will be seen from the foregoing examples that the flux composition of the present invention makes possible the brazing of aluminum metal and aluminum alloys by conventional brazing techniques which were generally unsuccessful heretofore in brazing aluminum. The novel flux composition is characterized by its fusibility and great affinity for surface layers of aluminum oxide at temperatures below the melting point of aluminum while remaining physically and chemically stable at temperatures above the melting point of aluminum. The advantages of a brazing flux possessing these characteristics is apparent from the foregoing description of the invention.

We claim:

1. A brazing flux for aluminum characterized by both fusibility and a solubility for a surface oxide on aluminum below the melting point of aluminum and by physical and chemical stability above the melting point of aluminum consisting essentially of the product of fusing to homogeneity a mixture of aluminum chloride and an alkali metal chloride of the group consisting of sodium, potassium and lithium chlorides in which the molar proportion of aluminum chloride in the aluminum chloride-alkali metal chloride mixture ranges between about 20% and about 50%.

2. A brazing flux for aluminum characterized by both fusibility and a solubility for a surface oxide on aluminum below the melting point of aluminum and by physical and chemical stability above the melting point of aluminum consisting essentially of the product of fusing to homogenity a mixture of aluminum chloride and an alkali metal chloride of the group consisting of sodium, potassium and lithium chlorides in which the molar proportion of aluminum chloride in the aluminium chloride-alkali metal chloride mixture ranges between about 20% and about 25%.

3. A brazing flux for aluminum characterized by both fusibility and a solubility for a surface oxide on aluminum below the melting point of aluminum and by physical and chemical stability above the melting point of aluminum consisting essentially of the product of fusing to homogeneity a mixture of aluminum chloride and sodium chloride in which the molar proportion of aluminum chloride in the aluminum chloride-sodium chloride mixture ranges between about 20% and about 50%.

4. A brazing flux for aluminum characterized by both fusibility and a solubility for a surface oxide on aluminum below the melting point of aluminum and by physical and chemical stability above the melting point of aluminium consisting essentially of the product of fusing to homogeneity a mixture of aluminum chloride and sodium chloride in which the molar proportion of aluminum chloride in the aluminum chloride-sodium chloride mixture ranges between about 20% and about 25%.

5. The method of producing a brazing flux for aluminum characterized by both fusibility and a solubility for a surface oxide on aluminum below the melting point of aluminum and by physical and chemical stability above the melting point of aluminum which comprises covering a mass of solid aluminum chloride in a melting vessel with a mass of solid alkali metal chloride of the group consisting of sodium, potassium and lithium chloride, the mol proportion of aluminum chloride in the aluminum chloride-alkali metal chloride mixture ranging between about 20% and about 50%, heating the resulting salt mass to form a clear homogeneous melt, cooling the melt until it solidifies, and then comminuting the resulting solid product into a form suitable for use as a brazing flux.

6. The method of producing a brazing flux for aluminum characterized by both fusibility and a solubility for a surface oxide on aluminum below the melting point of aluminum and by physical and chemical stability above the melting point of aluminum which comprises covering a mass of solid aluminum chloride in a melting vessel with a mass of solid alkali metal chloride of the group consisting of sodium, potassium and lithium chloride, the mol proportion of aluminum chloride in the aluminum chloride-alkali metal chloride mixture ranging between about 20% and about 25%, heating the resulting salt mass to form a clear homogeneous melt, cooling the melt until it solidifies, and then comminuting the resulting solid product into a form suitable for use as a brazing flux.

7. The method of producing a brazing flux for aluminum characterized by both fusibility and a solubility for a surface oxide on aluminum below the melting point of aluminum and by physical and chemical stability above the melting point of aluminum which comprises covering a mass of solid aluminum chloride in a melting vessel with a mass of solid sodium chloride, the mol proportion of aluminum chloride in the aluminum chloride-sodium chloride mixture ranging between about 20% and about 50%, heating the resulting salt mass to form a clear homogeneous melt, cooling the melt until it solidifies, and then comminuting the resulting solid product into a form suitable for use as a brazing flux.

8. The method of producing a brazing flux for aluminum characterized by both fusibility and a solubility for a surface oxide on aluminum below the melting point of aluminum and by physical and chemical stability above the melting point of aluminum which comprises covering a mass of solid aluminum chloride in a melting vessel with a mass of solid sodium chloride, the mol proportion of aluminum chloride in the aluminum chloride-sodium chloride mixture ranging between about 20% and about 25%, heating the resulting salt mass to form a clear homogeneous melt, cooling the melt until it solidifies, and then comminuting the resulting solid products into a form suitable for use as a brazing flux.

References Cited in the file of this patent

UNITED STATES PATENTS

| | | |
|---|---|---|
| 1,312,154 | Bonsteel | Aug. 5, 1919 |
| 2,507,346 | Miller | May 9, 1950 |